US010065838B2

(12) United States Patent
Schneider et al.

(10) Patent No.: US 10,065,838 B2
(45) Date of Patent: Sep. 4, 2018

(54) TRUSS CONSTRUCTION FOR A PASSENGER CONVEYOR COMPRISING A DRAWER MECHANISM

(71) Applicants: Otis Elevator Company, Farmington, CT (US); Jennifer Schneider, Vienna (AT)

(72) Inventors: Jennifer Schneider, Vienna (AT); Walter Srb-Gaffron, Baden (AT)

(73) Assignee: OTIS ELEVATOR COMPANY, Farmington, CT (US)

(*) Notice: Subject to any disclaimer, the term of this patent is extended or adjusted under 35 U.S.C. 154(b) by 0 days.

(21) Appl. No.: 15/501,565

(22) PCT Filed: Aug. 7, 2014

(86) PCT No.: PCT/EP2014/067014
§ 371 (c)(1),
(2) Date: Feb. 3, 2017

(87) PCT Pub. No.: WO2016/020007
PCT Pub. Date: Feb. 11, 2016

(65) Prior Publication Data
US 2017/0225928 A1 Aug. 10, 2017

(51) Int. Cl.
*B65G 21/00* (2006.01)
*B66B 23/14* (2006.01)
*B66B 21/10* (2006.01)

(52) U.S. Cl.
CPC .............. *B66B 23/14* (2013.01); *B66B 21/10* (2013.01)

(58) Field of Classification Search
CPC ................................ B66B 23/14; B66B 21/10
(Continued)

(56) References Cited

U.S. PATENT DOCUMENTS 5,511,647 A * 4/1996 Adrian .................... B66B 31/00 198/335
7,861,843 B2 1/2011 Aulanko et al.

FOREIGN PATENT DOCUMENTS

EP 1706349 B1 9/2008
EP 1706350 B1 11/2011
(Continued)

OTHER PUBLICATIONS

International Search Report for application PCT/EP2014/067014, dated Apr. 2, 2015, 9 pages.
(Continued)

*Primary Examiner* — Gene O Crawford
*Assistant Examiner* — Lester Ill Rushin
(74) *Attorney, Agent, or Firm* — Cantor Colburn LLP

(57) ABSTRACT

A truss section (2) which is configured to support at least one tread element in a passenger area (30) of a passenger conveyor (15) of the type conveying passengers by moving the at least one tread element in a longitudinal direction along the passenger area (30) between a first landing and a second landing area, comprises at least two longitudinal elements (5*a*, 5*b*) extending basically parallel to each other in the longitudinal direction; and a drawer mechanism (19) including at least one moveable portion (11, 12, 13), which is slidable between an open position allowing access to a maintenance space of the conveyor (15) in the passenger area (30), and a closed position in which the moveable portion (11, 12, 13) does not allow access to the maintenance space.

16 Claims, 6 Drawing Sheets

(58) Field of Classification Search
USPC ............................ 198/860.4, 321, 735.4, 326
See application file for complete search history.

(56) References Cited

FOREIGN PATENT DOCUMENTS

| | | | |
|---|---|---|---|
| EP | 1718556 | B1 | 6/2012 |
| JP | H08188365 | A | 7/1996 |
| JP | 2003112880 | A | 4/2003 |
| JP | 2008019035 | A | 1/2008 |
| WO | 2005070809 | A2 | 8/2005 |
| WO | 2005070810 | A2 | 8/2005 |
| WO | 2005097650 | A3 | 10/2005 |

OTHER PUBLICATIONS

Chinese First Office Action and Search Report for application CN 2014800810401, dated Jan. 3, 2018, 5 pages.

* cited by examiner

TRUSS CONSTRUCTION FOR A PASSENGER CONVEYOR COMPRISING A DRAWER MECHANISM

The present invention relates to a passenger conveyor.

Passenger conveyors are e.g. escalators or moving walkways. Escalators are passenger conveyors that typically carry passengers between landings at different levels in buildings, for example. Moving walkways are usually used to carry passengers along levels extending horizontally or with only slight inclination.

A passenger conveyor typically includes a truss construction, balustrades with movable handrails, tread members, e.g. plates, a drive system and a step chain for engaging and propelling the tread members. In an escalator the tread members typically have the form of steps, while they typically have the form of pallets in case of a moving walkway. The step chain travels in an endless way between turnaround sections located at an upstream landing and a down-stream landing, respectively. The truss construction supports the other components of the conveyor and rests on a basement. The truss construction includes truss sections on lateral sides of the tread members, each truss section generally extending in a vertical plane extending along the conveying direction. Each truss section has two end sections. The end sections at both lateral sides on a respective longitudinal side of the conveyor form a landing, respectively. The end sections of a same lateral side are connected by an inclined or—in case of a moving walkway—generally horizontal midsection. Typically, one of the landings, e.g. in case of an escalator usually the upper landing, houses the drive system or machine of the passenger conveyor positioned laterally between the truss sections.

In an escalator, in order to bridge the vertical distances between the landings, the treads are arranged staggered to each other in the transporting area, such as to form a step like floor surface. In a moving walkway, the treads form a plan floor surface in the transporting area traveling horizontally or with slight inclination.

Occasionally there is a need to access the drive system or machine of the passenger conveyor for inspection, maintenance and/or repair.

In commonly known passenger conveyors usually elements of the truss need to be dismantled and removed in order to access the drive system or machine, which is time consuming and considerably increases the costs for inspection, maintenance and/or repair. Thus, it is desirable to facilitate the access the drive system or machine of a conveyor system.

The present invention is particularly applicable to a truss construction for a basically horizontally conveying passenger conveyor as e.g. a moving walkway.

According to an exemplary embodiment of the invention the truss of a conveyor system of the type conveying passengers by moving the at least one tread element in a longitudinal direction along the passenger area between a first landing and a second landing comprises at least one truss section which is configured to support at least one tread element in a passenger area of the passenger conveyor. The truss section comprises at least two longitudinal elements extending basically parallel to each other in the longitudinal direction and a drawer mechanism including at least one moveable portion sliding between an open position allowing access to a maintenance space provided below a floor surface of the conveyor in the passenger area, and a closed position in which the moveable portion does not allow access to the maintenance space.

A truss section according to an exemplary embodiment of the invention provides fast and easy access to the drive system and/or a machine located in the maintenance space by opening the drawer mechanism and allows a fast return to the closed position after the (maintenance) work has been completed and access to the a drive system or machine is no longer needed. In consequence, the costs and the time needed for inspection, maintenance and/or repair of the conveyor system are substantially reduced.

In the following a truss for a passenger conveyor according to an exemplary embodiment of the invention will be described in detail with reference to the enclosed figures.

The figures and the following discussion describe particular embodiments of the invention so as to teach those skilled in the art how to produce and use the best modes of the invention. In order to teach the principle of the invention, several conventional aspects have been simplified or omitted. Those skilled in the art should understand that variations originating from these embodiments also fall within the scope of the invention. Those skilled in the art should understand that the features to be described below can be combined in various ways so as to form numerous variations of the invention. Therefore, the invention is not limited to the following particular embodiments and is merely defined by the appended claims and their equivalents.

SHORT DESCRIPTION OF THE FIGURES

DETAILED DESCRIPTION OF THE FIGURES

Figure 1:
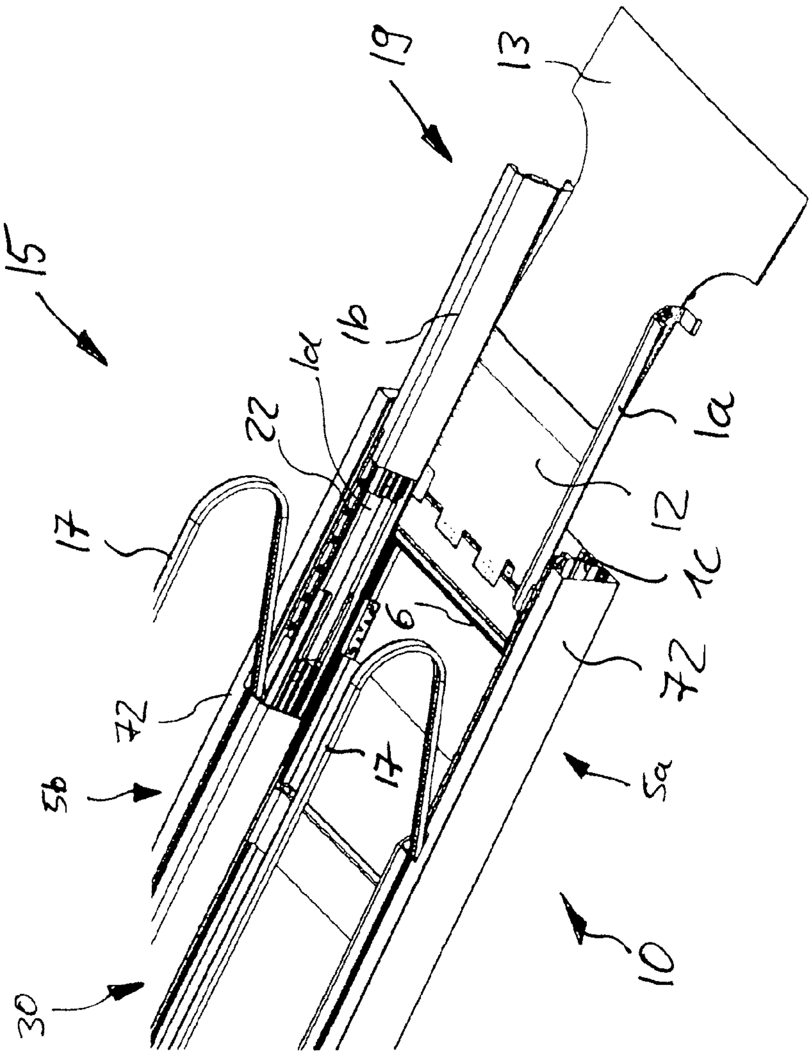
FIG. 1 shows a perspective view of an end portion of a passenger conveyor according to an exemplary embodiment of the invention.

FIG. 1 shows a perspective view of a landing portion of a passenger conveyor 15 according to an exemplary embodiment of the invention.

The passenger conveyor 15 comprises a truss 10 for supporting tread members, which are not shown in FIG. 1, and two balustrades extending parallel to the truss 10 respectively supporting a moving handrail 17.

An outer end portion of the truss 10 forming a landing portion is provided with a drawer mechanism 19 providing easy access to a maintenance space (not shown), which is provided below the truss 10.

The structure of the truss 10 and the drawer mechanism 19 will be described in more detail with respect to the following figures.

Figure 2:
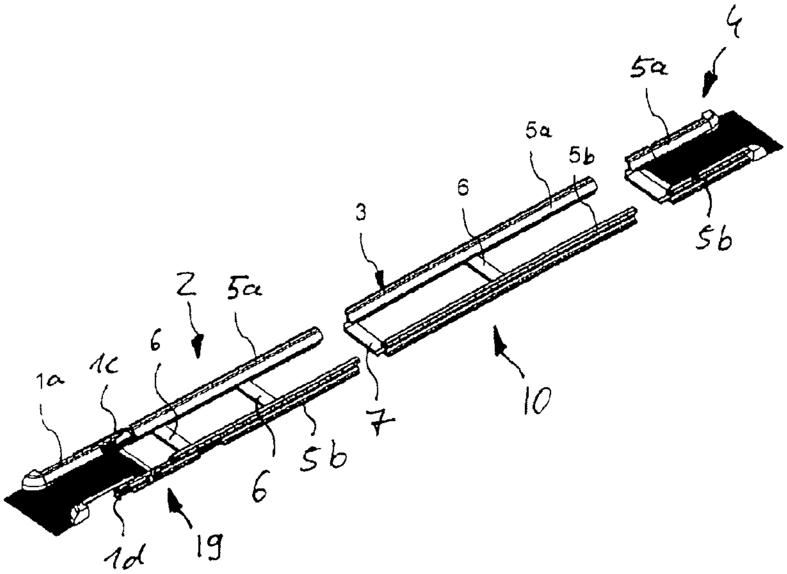
FIG. 2 shows a perspective view of an embodiment of truss for a passenger conveyor according to an exemplary embodiment of the invention.

FIG. 2 shows a perspective view of an embodiment of a truss 10 according to an exemplary embodiment of the invention.

The exemplary embodiment of a truss 10 for a passenger conveyor 15, as it is shown in the enclosed figures, comprises a drive landing section 2, at least one mid section 3 and a return landing section 4. Said sections 2, 3, 4 are arranged adjacent to each other in the longitudinal direction of the truss 10. Although only one mid section 3 is shown in FIG. 3, it is understood that a plurality of mid sections 3 may be provided in other embodiments of the invention, depending on the required length of the passenger conveyor 15.

Each of the sections 2, 3, 4 comprises two longitudinal truss elements 5*a*, 5*b* extending basically parallel to each other in the longitudinal direction. Lateral connectors 6, 7 extend laterally, in particular orthogonally, to the longitudinal direction between the longitudinal elements 5*a*, 5*b* such as to connect the longitudinal elements 5*a*, 5*b* with each other. The ends of the lateral connectors 6, 7 are respectively connected between the longitudinal elements 5*a*, 5*b* forming a rigid framework comprising the two longitudinal elements 5*a*, 5*b* and a plurality of lateral connectors 6, 7.

On each end of the truss sections 2, 3, 4 in the longitudinal direction a respective end connector 7 is arranged such that it connects to both of two adjacent longitudinal sections 2, 3, 4, so that the end connector 7 aligns and fixes two adjacent truss sections 2, 3, 4 to each other. Each end connector 7 thereby connects a total of four longitudinal elements 5*a*, 5*b* with each other, forming a chain of truss sections 2, 3, 4 extending in the longitudinal direction of the truss 10. The end connectors 7 are shared by each two adjacent truss sections 2, 3, 4.

Figure 3:
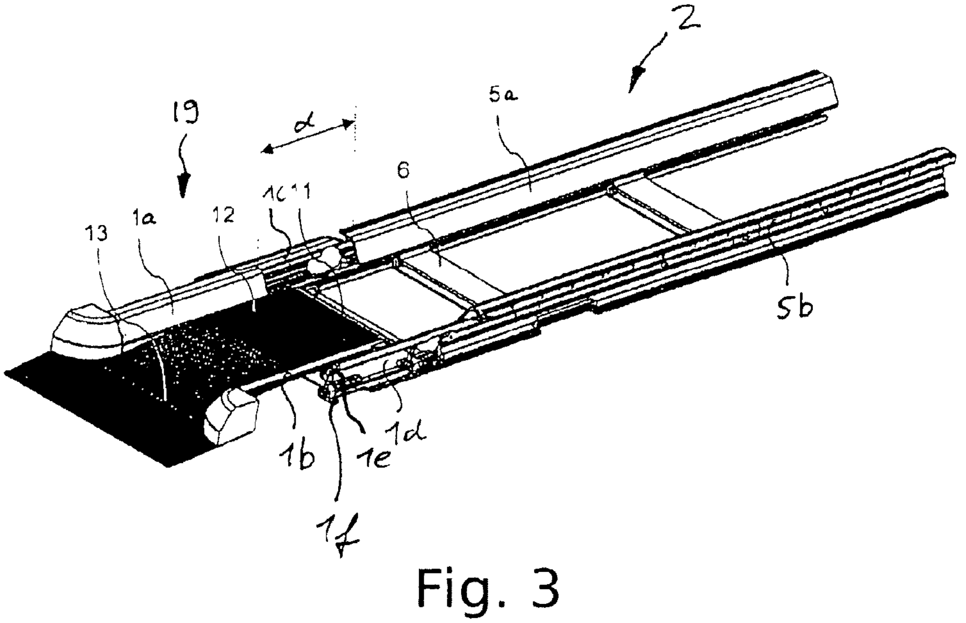
FIG. 3 shows an enlarged perspective view of an end section of the truss forming the driving landing module.

FIG. 3 shows an enlarged view of the section 2 forming the driving landing module, i.e. the landing module housing the motor (not shown) of the conveyor 15, and the drive mechanism for driving the pallet chain (not shown). In said section 2 the longitudinal elements 5*a*, 5*b* respectively comprise two parts 1*a*, 1*b*; 1*c*, 1*d* which are movable relative to each other. In each longitudinal element 5*a*, 5*b* an inner longitudinal part 1*a*, 1*b* is moveable in the longitudinal direction over a distance d with respect to a fixed outer longitudinal part 1*c*, 1*d*. In the embodiment shown in FIG. 3 the inner longitudinal part 1*a*; 1*b* faces the opposite longitudinal element 5*a*, 5*b* and the outer longitudinal part 1*c*, 1*d* faces away from the opposite longitudinal element 5*a*, 5*b*.

A floor plate 12 providing a lateral connector element of the conveyor 15 is attached to the inner parts 1*a*, 1*b*. A comb portion 11 and a ramp portion 13 are attached to the floor plate 12 and also attached to the inner parts 1*a*, 1*b*. However, the floor plate 12 may also be formed integrally with a comb portion 11 and/or a ramp portion 13. The inner parts 1*a*, 1*b* are sliding or rolling along the tracks of the outer remaining profile 1*c*, 1*d*, so that the floor plate 12 is also moveable with respect to the fixed portion of the truss 10 and the floor. This design provides a drawer mechanism 19 allowing an easy access to the entire inner space provided in and/or below the landing, so that the motor (not shown) and all additional devices for driving the conveyor 15, which are housed in a maintenance space below the truss 10, can be easily accessed and maintained by opening the drawer mechanism 19.

The fixed outer part 1*c*, 1*d* comprises a least on stopper element 1*f*, which is configured for stopping the opening and/or closing movement of the inner part 1*a*, 1*b*, and at least one fixture 1*e* for fixing the moveable inner part 1*a*, 1*b* in at least one of its open and closed positions.

Figure 4:
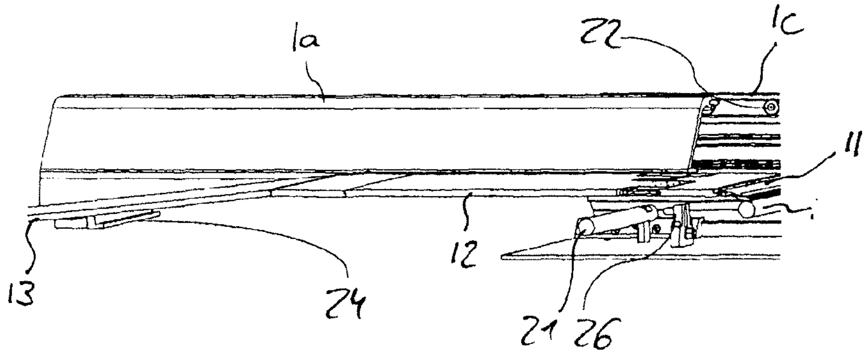
FIGS. 4 to 6 show side views of the drawer mechanism according to an exemplary embodiment of the invention, respectively.
Figure 5:
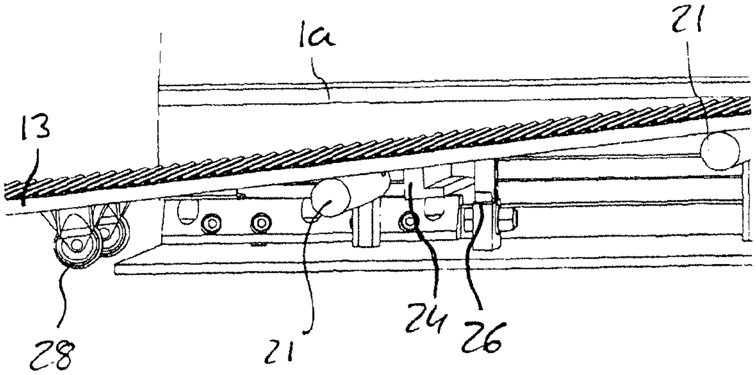
Figure 6:
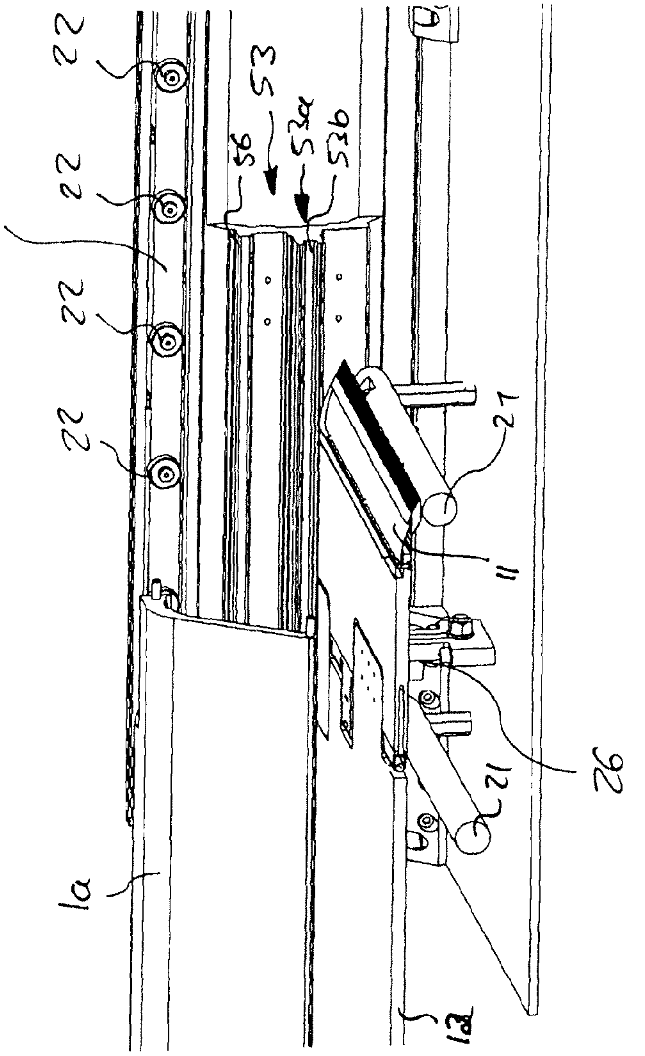

FIGS. 4 to 6 show side views of the drawer mechanism 19 according to an exemplary embodiment of the invention, respectively.

FIGS. 4 to 6 in particular show an inner part 1*a* of the truss 10, which is sliding with respective to a corresponding outer part 1*c*. Side rollers 22 are mounted to the outer part 1*c* for supporting the inner part 1*a* in a sliding manner.

The comb portion 11, the floor plate 12 and the ramp portion 13 are connected to the moveable inner part 1*a* in order to move together with said moveable inner part 1*a*.

A number of support elements 21 are provided for supporting the comb portion 11, the floor plate 12 and/or the ramp portion 13. In the embodiment shown in FIGS. 4 and 5 the support elements 21 are provided in the form of cylinders having an axis extending transversely, basically perpendicularly, to the length of the truss 10.

The support members 21 may be rotatable around their axes or provided with rollers, which are not shown in the figures, in order to reduce the friction between the support members 21 and the comb portion 11, the floor plate 12 and the ramp portion 13, respectively. Additional base rollers 28 are provided at a lower side of the ramp portion 13 supporting the ramp portion 13 in the floor and minimizing the friction between the ramp portion 13 and the floor when the ramp portion 13 is moved against the floor.

The ramp portion 13 and the truss 10 are respectively provided with locking members 24, 26, which are configured to engage with each other when the drawer mechanism 19 is positioned in its closed position in order to secure the ramp portion 13 in said closed position. In the engaged state the locking members 24, 26 in particular prevent the ramp portion 13 from lifting from the support members 21 even when a shock like load, which e.g. may be caused by a jumping passenger, is applied.

Guide tracks 55, 56, 57 for guiding the tread plates (not shown) are formed integral with longitudinal elements 5*a*, 5*b* of the truss 10, as will be discussed in more detail below with respect to FIGS. 7 and 8.

Figure 7:
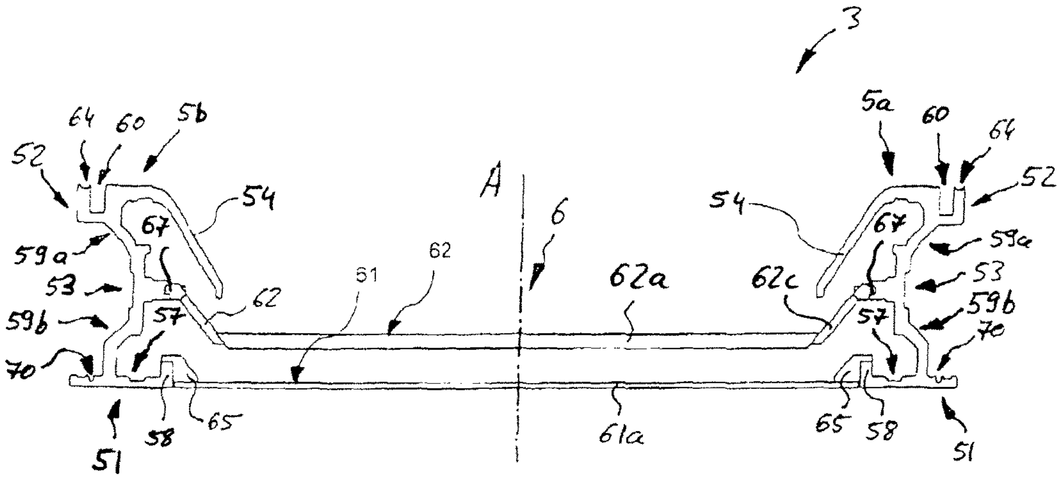
FIG. 7 shows a cross section of a mid section of the truss according to an exemplary embodiment of the invention.
Figure 8:
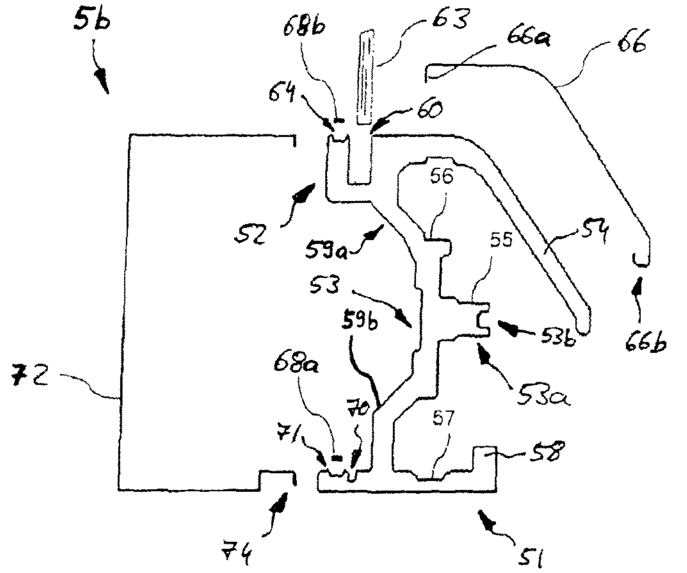
FIG. 8 shows an enlarged cross section of a longitudinal element from a mid section of a truss according to an exemplary embodiment of the invention.

FIG. 7 shows a mid section 3 of the truss 10, as it is shown in FIG. 2, in a cross sectional view; and FIG. 8 shows an enlarged cross section of the left longitudinal element 5*b* of said mid section 3.

The mid section 3 shown in FIG. 7 comprises two longitudinal elements 5*a*, 5*b* extending basically parallel to each other in a direction perpendicular to the plane of the drawings shown in FIGS. 7 and 8. The longitudinal elements 5*a*, 5*b* typically rest on a basement (not shown) basically along their entire length and travel in parallel to the basement. In particular, in the case of a moving walkway which does not have any inclination, or which does have some inclination with respect to the floor, the longitudinal elements 5*a*, 5*b* may rest on a horizontal basement or on a basement forming a ramp like structure.

Each of the longitudinal elements 5*a*, 5*b* may be formed as an extruded or roller-molded profile 5*a*, 5*b* made of a light metal, in particular aluminum. Both longitudinal elements 5*a*, 5*b* may be formed having an identical shape, so that both longitudinal elements 5*a*, 5*b* may be produced in the same manufacturing process of extruding or roller-molding. In order to form a mid section 3 of the truss 10, the longitudinal elements 5*a*, 5*b* are arranged in a mirrored orientation with respect to a virtual mirror plane A located in the middle between the two longitudinal elements 5*a*, 5*b*.

The longitudinal elements 5*a*, 5*b* have a genus of zero, i.e. in a cross-section which is oriented perpendicularly to the longitudinal direction of the longitudinal elements 5*a*, 5*b*, there are no closed curves or spaces. Such a structure considerably facilitates the production of the longitudinal elements 5*a*, 5*b* by means of extrusion and/or roller molding as it is complicated to form structures comprising closed curves and/or spaces in a sectional view by means of extrusion or roller-molding and therefore usually additional manufacturing steps, as e.g. fusing or welding, are necessary form forming said closed structures.

Each of the longitudinal elements 5*a*, 5*b* comprises a lower, basically horizontally oriented portion 51, a basically vertically extending middle portion 53 and an upper portion 52. In the embodiment shown, the middle portion 53 is connected with the upper portion 52 and the lower portion 51 by respective oblique intermediate portions 59*a*, 59*b*, but these intermediate portions may have another configuration or may be dispensed with in other embodiments. Each of the portions 51, 52, 53 is essentially flat, extends in a longitudinal plane and provides a load-bearing portion having the configuration of a single wall profile. Each of the longitudinal elements 5*a*, 5*b* thus has the configuration of a combination of load-bearing portions 51, 52, 53 each having the configuration of a single wall profile.

The load-bearing portions 51, 52, 53 include a substantially vertically extending medium portion 53 and a substantially horizontally extending lower foot portion 51, a lower part of the medium portion 53 being connected to the foot portion 51, any of the medium portion 53 and/or the foot portion 51 having the configuration of a single wall profile.

The medium portion 53 faces towards the passenger area 30 and the foot portion 51 extend from the medium portion 53 towards a side facing the passenger area 30 as well as towards an opposite side facing away from the passenger area 30.

On the side facing the opposing longitudinal element 5*a*, 5*b*, i.e. on the inner side of the truss 10, each of the lower portions 51 is formed with an engagement portion 58 configured to be engaged with a first connector element 61 of a lateral connector 6, which will be described in more detail below.

A first track 57 providing a return line for the chain rollers (not shown) of the conveyor 15 is formed on an upper surface of the lower portion 51 adjacent to the engagement portion 58 and an engaging element 65 of lateral connector 6.

On the outer side of the lower portion 51, i. e. the side facing away from the opposing longitudinal element 5*a*, 5*b*, a cover element receiving slot 70 is formed, which is configured for receiving an end portion 74 of an outer cover element 72 to be fixed to the outside of the truss 10.

A recess 71 is formed adjacent to the cover element receiving slot 70 for receiving at least one first magnetic element 68*a* in order to additionally fix the outer cover element 72 which may be made from magnetic material, in particular sheet metal.

The basically vertically extending middle portion 53 of the longitudinal element 5*a*, 5*b* comprises a protrusion 53*a* on the inner side, i. e. the side facing the opposing longitudinal element 5*a*, 5*b*. A groove 53*b*, which is configured for receiving a portion of a second connector element 62 of a lateral connector 6, is formed on the (inner) side of the protrusion 53*a* facing the opposing longitudinal element 5*a*, 5*b*. A second track 55 for guiding the chain rollers (not shown) of the conveyor 15 along the passenger line is formed on the upper surface of the protrusion 53*a*. A third track 56 for guiding pallet rollers of the conveyor 15 along the passenger line, is formed on an upper surface of the middle portion 53.

Thus, the entire track system 55, 56, 57 of the conveyor 15 including the passenger lines 56, 57 as well as the return line 55 is provided by the profiled bar-like elements forming the longitudinal elements 5*a*, 5*b*. As a result, it is not necessary to produce and install additional tracks for guiding the rollers of the conveyor 15, and the efforts and costs for producing and installing the conveyor system are considerably reduced.

All additional components, as e.g. plates, skirts etc., can be mounted to the truss 10 directly, in particular to the longitudinal elements 5*a*, 5*b*. Threads may be formed directly in the longitudinal elements 5*a*, 5*b* for mounting the additional components, which may be designed in a way so that screw, bolt, pin, nut etc. connections can be used which may even be visible for the passenger. In contrast to a classical truss arrangement, additional small light (LED) elements can be simply placed on or within the truss 10.

A balustrade receiving slot 60, which is configured for receiving at least one balustrade panel 63 of a conveyor's balustrade, is formed in an upper surface of the upper portion 52 of the longitudinal elements 5*a*, 5*b*. The balustrade panel 63 may be made of metal, glass, acrylic glass or any other suitable material.

Mounting the balustrade panels 63 be means of a slot 60, which is provided in an upper surface of the longitudinal elements 5*a*, 5*b*, facilitates the installation of the balustrade and reduces the costs for producing and installing the conveyor 15 even further.

A further recess 64 is provided in the upper portion 52 outside of to the balustrade receiving slot 60 in order to receive at least one second magnetic element 68*b*, which is configured to additionally fix the outer cover element 72.

Each of the longitudinal elements 5*a*, 5*b* further is formed comprising a decking skirt panel mounting area 54 extending obliquely from a position on the inner side of the upper portion 52 of the respective longitudinal element 5*a*, 5*b* adjacent to the slot 60 downward and to the opposing longitudinal element 5*a*, 5*b*.

A decking skirt panel 66 may be mounted and fixed to the decking skirt panel mounting area 54 by means of hooks 66*a*, 66*b* formed at the ends of the decking skirt panel 66 and wrapping around the decking skirt panel mounting area 54 when the decking skirt panel 66 is fixed to the longitudinal element 5*a*, 5*b*. Alternatively or additionally further magnetic elements (not shown) may be used for fixing the decking skirt panel 66 to the decking skirt panel mounting area 54.

Thus, longitudinal elements 5*a*, 5*b* according to exemplary embodiments of the invention not only save the efforts and costs for providing the tracks 55, 56, 57 for guiding the rollers of the conveyor system and mounting tracks to a conventional truss, but further allow to easily mount and fix the outer cover element 72 as well as the decking skirt panel 66.

Two respective longitudinal elements 5*a*, 5*b* opposing each other in lateral direction of the truss 10 are connected to each other by means of lateral connectors 6. Each of the connectors 6 comprises a first (lower) connector element 61 and a second (upper) connector element 62. The first connector element 61 and the second connector element 62 are arranged in different vertical positions, as it is shown in FIG. 7.

The first (lower) connector element 61 comprises a middle portion 61*a* extending basically horizontally between the longitudinal elements 5*a*, 5*b* and engaging elements 65, which are provided at both lateral ends of the middle portion 61*a* and engage with the corresponding engaging portions 58 formed at the inner ends of the lower horizontal portions 51 of the longitudinal elements 5*a*, 5*b*.

The second (upper) connector element 62 comprises a middle connector portion 62*a* extending basically horizontally between the longitudinal elements 5*a*, 5*b* and adjacent oblique portions 62*b*, 62*c* connected to the lateral ends of the middle connector portion 62*a* and extending upwardly thereof.

In order to fix the second connector element 62 to the longitudinal elements 5*a*, 5*b*, the lateral outer ends of the second connector element 62 facing the longitudinal elements 5*a*, 5*b* are respectively provided with a nose 67 engaging with the groove 53*b* formed in the protrusion 53*a* of the middle portion 53 of respective longitudinal element 5*a*, 5*b* facing the second connector element 62.

Fixing of the first and second lateral connector elements 61, 62 to the respective longitudinal elements 5*a*, 5*b* may be done by welding.

In consequence, the two longitudinal elements 5*a*, 5*b* in combination with the first and second connector elements 61, 62 provide a rigid framework comprising the two longitudinal elements 5*a*, 5*b* and a plurality of lateral connectors 6 formed by the first and second connector elements 61, 62.

Figure 9:
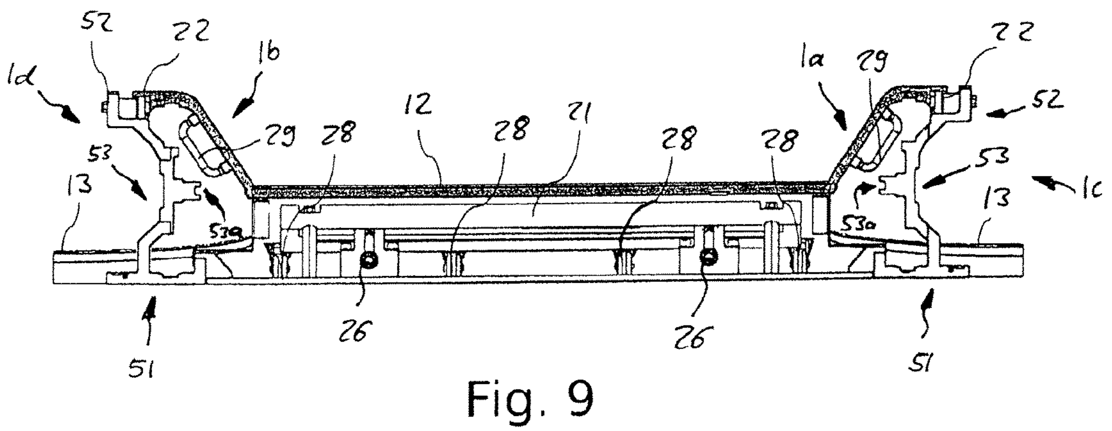
FIG. 9 shows a cross sectional view of a drive landing section of a truss according to an exemplary embodiment of the invention.

FIG. 9 shows a drive landing section 2 of the truss 10 in a cross sectional view.

The structure of outer longitudinal elements 1*c*, 1*d* corresponds to the structure of the longitudinal elements 5*a*, 5*b* shown in FIGS. 7 and 8 which is therefore not described in detail again.

In the upper portions 52 of the outer longitudinal elements 1*c*, 1*d* side rollers 22 are provided for moveably supporting the moveable inner longitudinal element 1*a*, 1*b* which are connected to each other by the lateral connector element (floor plate) 12.

Handles 29 are provided at the outside of the outer longitudinal elements 1*c*, 1*d*, respectively, in order to facilitate their movement. A support element 21 is provided below the lateral connector element 12. Below the support element 21 base rollers 28 moveably supporting the ramp portion 13 are shown. Locking elements 26 are provided for locking moveable portions of the drawer mechanism 19, in particular the lateral connector element 12 in its closed position.

A number of optional features are set out in the following. These features may be realized in particular embodiments, alone or in combination with any of the other features:

The truss section comprising the drawer mechanism may be configured to be in provided in at least one of the first and second landing areas of the conveyor as the maintenance space housing of the drive is usually located below one of the conveyor's landing areas.

The moveable portion may be moveable in the longitudinal direction of the is conveyor.

The moveable portion may comprise at least two longitudinal parts, which are slidable with respect to the at least two stationary longitudinal parts, respectively, providing a stable drawer mechanism which is easy to produce and to install.

The truss section may comprise a least one movable lateral connector element connecting the at least two movable longitudinal parts with each other in order to increase the mechanical stability of the drawer mechanism's movable portion.

The at least one movable lateral connector element may comprise a comb portion facing the conveyor's passenger area. This allows an easy installation of the comb portion without the need for additional elements supporting the comb portion and thereby reducing the number of elements, the weight and the costs of the truss even further.

The at least one movable lateral connector element may comprise a ramp portion facing away from the conveyor's passenger area. This allows to install the ramp portion easily without the need for additional elements supporting the ramp portion and to reduce the number of elements, the weight and the costs of the truss even further.

The a least one movable lateral connector element may comprise a main portion and a joint connecting the comb portion to the main portion allowing the comb portion to pivot with respect to the main portion, and/or a joint connecting the ramp portion to the main portion allowing the ramp portion to pivot with respect to the main portion. Such a movable lateral connector element provides a compact drawer mechanism including the ramp portion and the comb portion which may be moved together as a unit when opening and/or closing the drawer mechanism. This facilitates the operation of the drawer mechanism even further.

The truss section may comprise a locking mechanism which is configured for locking the moveable element in its closed and/or in its open position, respectively, in order to avoid any undesired movement of the moveable element when it is positioned in its closed or in its open position.

The locking mechanism in particular may be configured for preventing an up-ward motion of the comb and/or the ramp when a shock-like load, which e.g. may be caused by a jumping passenger, is applied to the comb and/or the ramp.

The truss section may comprise at least one support element which is configured for supporting at least a portion of the at least one lateral connector element. The at least one support element may comprise at least one roller for reducing any friction between the support element and the at least one lateral connector element when the at least one lateral connector element is moved with respect to the support element for reducing the force needed for opening/closing the drawer mechanism and thus facilitating its operation.

The moveable portion may comprise at least one handle for moving the moveable portion between its open position and its closed position, facilitating its operation. The moveable portion in particular further may comprise a removable portion, which is removable for providing access to the at least one handle and allowing to hide the handle when it is not needed, in order to prevent an unauthorized opening of the drawer mechanism. The removable portion may be lockable for reducing the risk of an unauthorized opening of the drawer mechanism even further.

The truss sections may be configured for being connected with a plurality of other truss modules arranged adjacent to each other in the longitudinal direction such as to form a truss providing a modular truss, which may be transported and installed easily.

The features set out above may be utilized in a passenger conveyor of the type conveying passengers by moving at least one tread element in a longitudinal direction along a passenger area between a first landing and a second landing, comprising a truss made up with a plurality of truss modules arranged adjacent to each other in the longitudinal direction, each of the truss modules comprising at least two longitudinal elements extending basically parallel to each other in the longitudinal direction; and a least one lateral connector connecting between the at least two longitudinal elements. At least one of the truss modules may have a configuration according to an exemplary embodiment of the invention as set out above.

This structure provides a passenger conveyor having a flat frame, which can be produced and mounted easily with sufficiently high accuracy. In addition, it is possible to integrate much functionality in such a truss construction.

In an embodiment the passenger conveyor may be a moving walkway configured for transporting passengers basically horizontally and/or parallel to a basement of the passenger area. The basement may be horizontal or defining a ramp like structure according to a desired inclination of the moving walkway. Generally, a moving walkway is considered to be a passenger conveyor where the treads form a substantially flat floor surface in the transporting area, in contrast to treads forming a step like floor space in the transporting area of an escalator.

Moving walkways, which are configured to extend basically parallel to a basement of the passenger area are in particular well suited to comprise a truss according to an exemplary embodiment of the invention, as the truss is supported by the basement over its entire lengths, which prevents the truss from bending. The truss section therefore may be produced from a very light material.

REFERENCE NUMERALS

1*a*, 1*b* inner, moveable longitudinal element
1*c*, 1*d* outer, fixed longitudinal element
1*e* fixture
1*f* stopper element
2 drive landing section
3 mid section
4 return landing section
5*a*, 5*b* longitudinal elements
6 lateral connector
7 lateral end connector
10 truss
11 comb portion
12 lateral connector element (floor plate)
13 ramp portion
15 passenger conveyor
17 handrail
19 drawer mechanism
21 support element
22 side roller
24 first locking element
26 second locking element
28 base roller
29 handle
30 passenger area
51 lower portion of the longitudinal element
52 upper portion of the longitudinal element
53 middle portion of the longitudinal element
53*a* protrusion
53*b* groove
54 skirt panel mounting area
55 second track
56 third track
57 first track
58 engagement portion
59*a*, 59*b* intermediate portions
60 balustrade receiving slot
61 first (lower) connector element
61*a* middle portion
62 second (upper) connector element
62*a* middle connector portion
62*b*, 62*c* oblique portions
63 balustrade panel
64 recess
65 decking skirt panel
66*a*, 66*b* hooks
67 nose
68*a* first magnetic element
68*b* second magnetic element
70 cover element receiving slot
71 recess
72 cover element
74 end portion

The invention claimed is:

1. A truss section configured to support at least one tread element in a passenger area of a passenger conveyor of the type conveying passengers by moving the at least one tread element in a longitudinal direction along the passenger area between a first landing and a second landing, the truss section comprising:

at least two longitudinal elements extending basically parallel to each other in the longitudinal direction; and a drawer mechanism including at least one moveable portion, which is slidable between an open position allowing access to a maintenance space of the conveyor in the passenger area and a closed position in which the moveable portion does not allow access to the maintenance space;

wherein the moveable portion comprises at least two longitudinal parts, which are slidable with respect to the at least two stationary longitudinal parts, respectively.

2. The truss section according to claim 1, which is configured to be provided in at least one of the first and second landing areas of the conveyor.

3. The truss section according to claim 1, wherein the moveable portion is moveable in the longitudinal direction.

4. The truss section according to claim 1, wherein the maintenance space is provided below a floor surface of the conveyor.

5. The truss section according to claim 1, comprising a least one movable lateral connector element connecting the at least two movable longitudinal parts with each other.

6. The truss section according to claim 5, wherein the at least one movable lateral connector element comprises a comb portion facing the conveyor's passenger area.

7. The truss section (2) according to claim 6, wherein the a least one movable lateral connector element comprises a main portion, a joint connecting the comb portion with the main portion and allowing the comb portion to pivot with respect to the main portion, and/or a joint connecting the ramp portion to the main portion and allowing the ramp portion to pivot with respect to the main portion.

8. The truss section according to claim 5, wherein the at least one movable lateral connector element comprises a ramp portion facing away from the conveyor's passenger area.

9. The truss section according to claim 5, comprising at least one support element which is configured for supporting at least a portion of the at least one lateral connector element.

10. The truss section (2) according to claim 9 wherein the at least one support element comprises at least one roller.

11. A Truss module which is configured to be connected with a plurality of other truss modules arranged adjacent to each other in the longitudinal direction such as to form a truss; the truss module comprising a truss section according to claim 1.

12. Passenger conveyor of the type conveying passengers by moving at least one tread element in a longitudinal direction along a passenger area between a first landing and a second landing, the passenger conveyor comprising a truss made up with a plurality of truss modules arranged adjacent to each other in the longitudinal direction, each of the truss modules comprising at least two longitudinal elements extending basically parallel to each other in the longitudinal direction and a least one lateral connector connecting the at least two longitudinal elements, wherein at least one of the truss modules is a truss module according to claim 11.

13. Passenger conveyor according to claim 12, wherein the passenger conveyor is a moving walkway which is configured for transporting passengers basically parallel to a basement in the passenger area.

14. A truss section configured to support at least one tread element in a passenger area of a passenger conveyor of the type conveying passengers by moving the at least one tread element in a longitudinal direction along the passenger area between a first landing and a second landing, the truss section comprising:

at least two longitudinal elements extending basically parallel to each other in the longitudinal direction;

a drawer mechanism including at least one moveable portion, which is slidable between an open position allowing access to a maintenance space of the conveyor in the passenger area and a closed position in which the moveable portion does not allow access to the maintenance space;

a locking mechanism which is configured for locking the moveable element in its closed position and/or in its open position.

15. The truss section according to claim 14, wherein the locking mechanism is configured for preventing an upward motion of the comb portion and/or the ramp portion when it is positioned in its closed position.

16. A truss section configured to support at least one tread element in a passenger area of a passenger conveyor of the type conveying passengers by moving the at least one tread element in a longitudinal direction along the passenger area between a first landing and a second landing, the truss section comprising:

at least two longitudinal elements extending basically parallel to each other in the longitudinal direction; and a drawer mechanism including at least one moveable portion, which is slidable between an open position allowing access to a maintenance space of the conveyor in the passenger area and a closed position in which the moveable portion does not allow access to the maintenance space;

wherein the moveable portion comprises at least one handle allowing to move the moveable portion between its open position and its closed position, and particularly further comprising a removable portion, which is removable for providing access to the at least one handle.

* * * * *